United States Patent
Cho-Choi et al.

(10) Patent No.: US 12,043,198 B2
(45) Date of Patent: Jul. 23, 2024

(54) AIRBAG COVER OF A VEHICLE

(71) Applicant: Bayerische Motoren Werke Aktiengesellschaft, Munich (DE)

(72) Inventors: Jea-Woon Cho-Choi, Munich (DE); Roland Hain, Munich (DE); Marlies Michel, Oberschleissheim (DE); Harald Schluder, Munich (DE); Johann Zandt, Hohenkammer (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/801,842

(22) PCT Filed: Apr. 16, 2021

(86) PCT No.: PCT/EP2021/059976
§ 371 (c)(1),
(2) Date: Aug. 24, 2022

(87) PCT Pub. No.: WO2021/219405
PCT Pub. Date: Nov. 4, 2021

(65) Prior Publication Data
US 2023/0082763 A1 Mar. 16, 2023

(30) Foreign Application Priority Data
Apr. 27, 2020 (DE) .............. 10 2020 111 343.9

(51) Int. Cl.
*B60R 21/2165* (2011.01)
(52) U.S. Cl.
CPC ............... *B60R 21/21656* (2013.01)

(58) Field of Classification Search
CPC ............................................. B60R 21/2165
See application file for complete search history.

(56) References Cited

U.S. PATENT DOCUMENTS

| 5,429,784 | A | * | 7/1995 | Iannazzi | ............. B60R 21/2165 264/126 |
| 5,839,752 | A | | 11/1998 | Yamasaki et al. | |
| 6,753,057 | B1 | * | 6/2004 | Gardner, Jr. | .............. B32B 5/18 428/221 |
| 7,810,836 | B2 | * | 10/2010 | Muller | ................ B60R 21/2165 280/728.2 |

(Continued)

FOREIGN PATENT DOCUMENTS

| CN | 1669848 | A | * | 9/2005 | ............ B60R 21/36 |
| CN | 102019900 | A | | 4/2011 | |

(Continued)

OTHER PUBLICATIONS

Chinese-language Office Action issued in Chinese Application No. 202180021354.2 dated May 30, 2023 with English translation (13 pages).

(Continued)

*Primary Examiner* — Nicole T Verley
(74) *Attorney, Agent, or Firm* — Crowell & Moring LLP

(57) ABSTRACT

An airbag cover of a vehicle includes a support having at least one predeterminable breaking line that is breakable by an airbag, a transparent upper layer on the support, and at least one film positioned between the support and the transparent upper layer.

14 Claims, 1 Drawing Sheet

(56) References Cited

U.S. PATENT DOCUMENTS

| | | | |
|---|---|---|---|
| 8,651,514 B2 * | 2/2014 | Zhang | B60R 21/2165 280/732 |
| 2005/0215143 A1 * | 9/2005 | Hehn | B32B 5/24 442/58 |
| 2007/0018435 A1 * | 1/2007 | Muller | B60R 21/2165 280/732 |
| 2009/0269538 A1 | 10/2009 | Buhring et al. | |
| 2011/0101653 A1 | 5/2011 | Rick et al. | |
| 2012/0299273 A1 | 11/2012 | Lesnik | |
| 2014/0211498 A1 * | 7/2014 | Cannon | B60Q 3/217 362/555 |
| 2016/0137154 A1 * | 5/2016 | Sasu | B60R 21/2165 156/252 |
| 2020/0036411 A1 | 1/2020 | Kandler | |
| 2022/0134728 A1 * | 5/2022 | Topp | B23K 26/386 428/43 |

FOREIGN PATENT DOCUMENTS

| | | | | |
|---|---|---|---|---|
| CN | 102795190 A | | 11/2012 | |
| CN | 105196956 A | | 12/2015 | |
| DE | 19819573 A1 | * | 11/1998 | B60R 21/2165 |
| DE | 195 40 563 C2 | | 5/1999 | |
| DE | 10055546 A1 | * | 9/2001 | B26D 3/08 |
| DE | 100 20 525 A1 | | 10/2001 | |
| DE | 10020525 A1 | * | 10/2001 | B60R 13/0237 |
| DE | 10149038 A1 | * | 4/2003 | B29C 37/0057 |
| DE | 10203407 A1 | * | 8/2003 | B60R 21/2165 |
| DE | 19617874 C2 | * | 12/2003 | B29C 37/0057 |
| DE | 696 27 259 T2 | | 4/2004 | |
| DE | 19833336 B4 | * | 7/2005 | B29C 45/14467 |
| DE | 102005034354 A1 | * | 2/2007 | B60R 21/2165 |
| DE | 102006025647 A1 | * | 12/2007 | B60R 21/216 |
| DE | 10 2007 002 230 A1 | | 7/2008 | |
| DE | 10 2006 062 642 B3 | | 8/2008 | |
| DE | 102007013108 B3 | * | 8/2008 | B23K 26/0622 |
| DE | 10 2009 041 711 A1 | | 3/2011 | |
| DE | 102009043498 A1 | * | 4/2011 | B32B 27/08 |
| DE | 102010030981 A1 | * | 1/2012 | B60R 21/2165 |
| DE | 202010015903 U1 | * | 5/2012 | B32B 9/02 |
| DE | 102011118575 A1 | * | 5/2013 | B60K 35/00 |
| DE | 10 2012 209 609 A1 | | 12/2013 | |
| DE | 102012106238 A1 | * | 1/2014 | B26D 3/00 |
| DE | 102015003448 A1 | * | 8/2015 | B29C 45/1418 |
| DE | 102014104906 A1 | * | 10/2015 | B32B 5/02 |
| DE | 10 2016 218 874 A1 | | 3/2018 | |
| DE | 102018122272 A1 | * | 3/2019 | B23K 26/0624 |
| DE | 102021200983 A1 | * | 8/2022 | |
| EP | 0818359 A1 | * | 1/1998 | |
| EP | 1493545 A1 | * | 1/2005 | B29C 45/0081 |
| EP | 1 588 906 A1 | | 10/2005 | |
| EP | 1745989 A1 | * | 1/2007 | B60R 21/2165 |
| EP | 2684745 A1 | * | 1/2014 | B26D 3/00 |
| GB | 2289644 A | * | 11/1995 | B29C 44/0415 |
| GB | 2473714 A | * | 3/2011 | B60R 21/21656 |
| WO | WO-2008009532 A1 | * | 1/2008 | B60R 21/20 |
| WO | WO-2008104230 A1 | * | 9/2008 | B23K 26/044 |
| WO | WO-2010057679 A1 | * | 5/2010 | B23K 26/364 |

OTHER PUBLICATIONS

International Search Report (PCT/ISA/210) issued in PCT Application No. PCT/EP2021/059976 dated Jul. 13, 2021 with English translation (four (4) pages).

German-language Written Opinion (PCT/ISA/237) issued in PCT Application No. PCT/EP2021/059976 dated Jul. 13, 2021 (six (6) pages).

German-language Search Report issued in German Application No. 10 2020 111 343.9 dated Apr. 30, 2021 with partial English translation (13 pages).

* cited by examiner

AIRBAG COVER OF A VEHICLE

BACKGROUND AND SUMMARY OF THE INVENTION

This application claims priority under 35 U.S.C. § 119 from German Patent Application No. DE 10 2020 111 343.9, filed Apr. 27, 2020, the entire disclosure of which is herein expressly incorporated by reference.

The present invention relates to an airbag cover for a vehicle, and to a method for producing this airbag cover.

In vehicles, the airbag, that is to say the uninflated sack and the corresponding components for inflating, is conventionally arranged under an airbag cover. Such airbag covers may have predetermined breaking lines, which break open when the airbag is triggered. Owing to these predetermined breaking lines in the airbag covers, relatively tight limits are placed on production and design, since it is always a priority for the function of the airbag to be fulfilled.

It is an object of the present invention to specify an airbag cover that ensures secure operation of the airbag together with easy production and at the same time allows the greatest possible design freedom.

The object is achieved by the features of the independent claims. The dependent claims relate to advantageous configurations of the invention.

It is provided that the airbag cover of the vehicle comprises a carrier. This carrier has at least one predetermined breaking line that can be broken open by the airbag. In this respect, multiple predetermined breaking lines may also be provided. For the sake of simplicity, usually only the configuration of one predetermined breaking line will be described here. The predetermined breaking line is designed such that it breaks when the airbag is triggered. "Breaking" is to be understood to mean that the carrier layer is destroyed in the region of the predetermined breaking line. The way in which this functions in detail, whether by breaking, tearing or by another process, is not relevant here.

The airbag cover also comprises a transparent top layer on the carrier. In this respect, the top layer is at least partially transparent, with the result that underlying elements and/or colors or patterns are visible.

At least one film is positioned at least in certain regions between the carrier and the top layer. This film is in particular colored and/or patterned. Since the top layer is transparent and a film is inserted at least in certain regions between the carrier and the top layer, the visual appearance of the airbag cover can be designed easily. At the same time, a corresponding selection of the configuration and/or positioning of the film makes it possible for there to be no disruption of the function of the at least one predetermined breaking point by the film.

In a preferred embodiment, it is provided that the carrier is injection molded. In this case, the film is back-molded with plastic of the carrier.

The top layer is preferably manufactured from polyurethane (PUR). In particular, flooding with polyurethane is carried out to form the top layer. The use of polyurethane makes it possible to create a transparent top layer. At the same time, the flooding of the top layer in the corresponding tool makes it possible to configure the layer thicknesses of the top layer and of the surface of the top layer as desired.

It is thus preferably provided that the surface of the top layer has a texture and/or a grain structure. The surface may also be polished to high reflectivity or with different degrees of reflectivity.

Furthermore, it is preferably provided that the top layer has a reduced layer thickness at the predetermined breaking line in relation to surrounding regions. As a result, the predetermined breaking line provided in the carrier also continues in the top layer, but is not visible and cannot be felt.

Furthermore, it is preferably provided that a film is positioned, and/or no film is positioned, and/or the film is perforated, and/or two films are positioned in abutment, and/or two films overlap, at the predetermined breaking line. Since it is also provided that multiple films are inserted and/or that multiple predetermined breaking lines are provided, it is also possible to combine multiple ones of these advantageous configurations with one another.

Positioning no film at the predetermined breaking line has the effect that the film does not influence the function of the predetermined breaking line. Perforating the film, arranging films in abutment or overlapping the films in the region of the predetermined breaking line has the effect that the functional predetermined breaking line continues in the region of the film or films, respectively, and therefore also can be broken open here.

As already described, the different layer thicknesses in the top layer make it possible to have the effect that the predetermined breaking line also continues in the top layer, but is not visible. In addition, it is also possible to influence the visual appearance of the airbag cover as a result of different layer thicknesses in the top layer, in order for example to use a thicker layer to bring about a depth effect.

It is therefore preferably provided that the top layer has at least a first region and at least a second region outside of the predetermined breaking line. The first region has a first layer thickness. The second region has a second layer thickness. The first layer thickness is preferably greater than the second layer thickness. In particular, it is provided that the first layer thickness is at least 1.3 times, particularly preferably at least twice, the second layer thickness.

An object is preferably positioned between the top layer and the carrier under the first region, that is to say the region with the greatest layer thickness. This object preferably exhibits a badge.

The object is preferably, similarly to the film, inserted into the injection molding tool and back-molded with the plastic of the carrier.

The invention also comprises an airbag module for a vehicle. This airbag module comprises a base. The airbag is arranged on or in this base. In this instance, the "airbag" describes the uninflated sack and the associated components for inflating. The base is covered by the airbag cover described, with the result that the airbag is located under the airbag cover.

The invention furthermore comprises a steering wheel for a vehicle. This steering wheel comprises the airbag module described. In this respect, the airbag module is located in particular in the region of the hub of the steering wheel.

A method for producing an airbag cover is furthermore provided. The airbag cover is in particular the airbag cover described above. In the course of the method, first of all at least one film is inserted into an injection molding tool. As already described, multiple films may also be inserted here. In the next method step, the at least one film is back-molded in the injection molding tool to form the carrier. An injection molding tool with two tool halves is preferably used here to produce the carrier.

In the next method step, the top side of the carrier is flooded with polyurethane to form the top layer.

It is particularly preferably provided that, after the back-molding to form the carrier, one tool half is removed and replaced by a different tool half. The mold impression for forming the top side is located in this newly added tool half. In this way, the top side can be produced in a fast production process. At the same time, changing over the tool halves makes it possible to design the surface of the top layer as desired. In this way, for example, the surface of the top layer can be provided with a texture or a grain structure.

Further details, features and advantages of the invention will become apparent from the following description and from the figures.

DETAILED DESCRIPTION

An airbag cover 1 as per one example embodiment will be described below with reference to FIGS. 1 and 2. In this respect, the airbag cover 1 is a constituent part of an airbag module 50. The airbag module 50 in turn is a constituent part of a steering wheel 100. The airbag cover 1 is produced by the method set out in the general part of the description.

Figure 1:
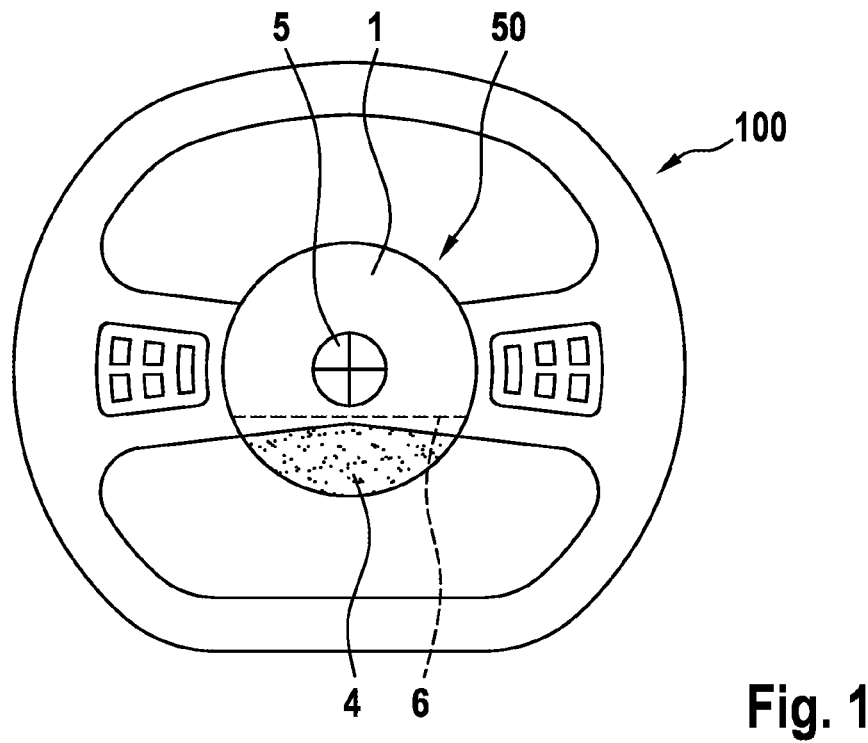
FIG. 1 shows a steering wheel with an airbag module and an airbag cover according to an embodiment of the invention.

FIG. 1 shows the steering wheel 100 with the airbag module 50 in the hub region of the steering wheel 100. FIG. 2 shows a purely schematically illustrated section through the airbag module 50. Relative sizes, in particular the thicknesses of individual layers, are not illustrated true to scale here.

The airbag module 50 comprises a base 51. This base 51 is closed by the airbag cover 1. The airbag 52 is located in the cavity between the airbag cover 1 and the base 51.

The airbag cover 1 comprises an injection-molded carrier 2 of plastic. The carrier 2 is covered with a top layer 3 of flooded polyurethane. An inserted film 4 is located in certain regions between the carrier 2 and the top layer 3. Since the top layer 3 is transparent, the colored film 4 is also visible.

An object 5, here positioned centrally in the steering wheel 100 and constituting a badge, is furthermore located between the carrier 2 and the top layer 3.

In the example shown, the airbag cover 1 has a predetermined breaking line 6, which is positioned purely schematically and by way of example here. The predetermined breaking line 6 is formed by a taper (reduced layer thickness) in the carrier 2 and the top layer 3.

Figure 2:
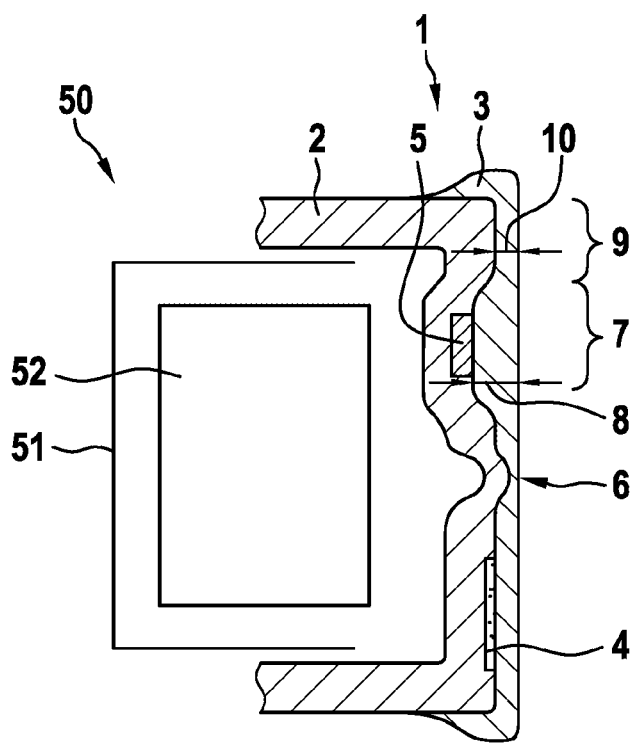
FIG. 2 shows a purely schematic sectional view of the airbag module from FIG. 1.

FIG. 2 purely schematically shows that the top layer 3 has a first region 7 with a first layer thickness 8 and a second region 9 with a second layer thickness 10. The object 5 is inserted at the first region 7. Here, the greater layer thickness 8 is also selected in order to use the transparent top layer 3 to achieve a depth effect in the region of the inserted object 5.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

1 Airbag cover
2 Carrier
3 Top layer
4 Film
5 Object
6 Predetermined breaking line
7 First region
8 First layer thickness
9 Second region
10 Second layer thickness
50 Airbag module
51 Base
52 Airbag
100 Steering wheel

The invention claimed is:

1. An airbag cover of a vehicle, comprising:
a carrier with at least one predetermined breaking line configured to be broken open by the airbag;
a transparent top layer on the carrier; and
at least one colored and/or patterned film between the carrier and the top layer, wherein the colored and/or patterned film is back-molded with a plastic of the carrier.

2. The airbag cover according to claim 1, wherein the top layer is formed from polyurethane.

3. The airbag cover according to claim 1, wherein at the predetermined breaking line, the at least one film includes two films abutting or overlapping one another.

4. The airbag cover according to claim 1, wherein at the predetermined breaking line, the at least one film is perforated.

5. The airbag cover according to claim 1, wherein at the predetermined breaking line, no portion of the at least one film is present.

6. An airbag cover of a vehicle, comprising:
a carrier with at least one predetermined breaking line configured to be broken open by the airbag;
a transparent top layer on the carrier; and
at least one film between the carrier and the top layer, wherein
the top layer has a first layer thickness at the predetermined breaking line which is a reduced thickness relative to a second top layer thickness in a region adjacent to the predetermined breaking line.

7. The airbag cover according to claim 6, wherein
at the predetermined breaking line
at least a portion of the at least one film is present,
no portion of the at least one film is present,
the at least one film is perforated, or
the at least one film includes two films abutting or overlapping one another.

8. The airbag cover according to claim 6, wherein
away from the predetermined breaking point, the top layer has a first region with a third layer thickness and a second region with a fourth layer thickness, and
the third layer thickness is greater than the fourth layer thickness.

9. The airbag cover according to claim 8, wherein
the third layer thickness is at least 1.3 times the fourth layer thickness.

10. The airbag cover according to claim 9, wherein
the third layer thickness is at least twice the fourth layer thickness.

11. The airbag cover according to claim 8, wherein
an object is positioned between the top layer and the carrier under the first region.

12. An airbag module for a vehicle, comprising:
a base;
an airbag cover arranged on the base; and an airbag arranged on the base between the base and the airbag cover, wherein the airbag cover includes a carrier with at least one predetermined breaking line configured to be broken open by the airbag, a transparent top layer on the carrier, and at least one colored and/or patterned film between the carrier and the top layer, wherein the colored and/or patterned film is back-molded with a plastic of the carrier.

13. A steering wheel for a vehicle, comprising an airbag module having a base, an airbag cover arranged on the base, and an airbag arranged on the base between the base and the airbag cover, wherein the airbag cover includes a carrier with at least one predetermined breaking line configured to be broken open by the airbag, a transparent top layer on the carrier, and at least one colored and/or patterned film between the carrier and the top layer, wherein the colored and/or patterned film is back-molded with a plastic of the carrier.

14. A method for producing an airbag cover having a carrier with at least one predetermined breaking line configured to be broken open by the airbag, a transparent top layer on the carrier, and at least one colored and/or patterned film between the carrier and the top layer, comprising the acts of:

inserting the at least one colored and/or patterned film into an injection molding tool;

back-molding the at least one colored and/or patterned film to form the carrier; and forming the top layer by flooding a top side of the carrier with polyurethane.

* * * * *